US012098839B2

(12) United States Patent
Valanzola et al.

(10) Patent No.: US 12,098,839 B2
(45) Date of Patent: Sep. 24, 2024

(54) APPLICATION-TARGETED LIGHT ON POWERED RATCHET OR RIGHT-ANGLE POWER TOOL

(71) Applicant: Ingersoll-Rand Industrial U.S., Inc., Davidson, NC (US)

(72) Inventors: Daniel M. Valanzola, Lebanon, NJ (US); Joshua O. Johnson, Allentown, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

(21) Appl. No.: 18/195,458

(22) Filed: May 10, 2023

(65) Prior Publication Data

US 2023/0366534 A1 Nov. 16, 2023

Related U.S. Application Data

(60) Provisional application No. 63/340,355, filed on May 10, 2022.

(30) Foreign Application Priority Data

Apr. 21, 2023 (CN) ......................... 202310432089.8
May 2, 2023 (EP) .................................... 23171195

(51) Int. Cl.
*F21V 33/00* (2006.01)
*B25B 21/00* (2006.01)
*B25B 23/18* (2006.01)

(52) U.S. Cl.
CPC ........ *F21V 33/0084* (2013.01); *B25B 21/004* (2013.01); *B25B 23/18* (2013.01)

(58) Field of Classification Search
CPC ...................................................... B25B 23/18
See application file for complete search history.

(56) References Cited

U.S. PATENT DOCUMENTS 6,260,979 B1 7/2001 Lin
7,137,761 B2 11/2006 Hara et al.
(Continued)

FOREIGN PATENT DOCUMENTS

JP 2002154065 A 5/2002
JP 2008229802 A 10/2008
(Continued)

OTHER PUBLICATIONS

"Model: RI574501; PWRCORE 12TM; Brushless 12V 1/4"; Hex Right Angle Impact Driver," SKIL® Owner's Manual, © Chervon North America, Jan. 2019.
(Continued)

*Primary Examiner* — Eric T Eide
(74) *Attorney, Agent, or Firm* — Kevin E. West; Advent, LLP

(57) ABSTRACT

A power tool having a handle extending along a longitudinal axis, wherein the handle is configured to house a motor. A ratchet head is connected to a first end of the handle. The ratchet head supports an output shaft having a drive square or bit that is driven by the motor. The ratchet wrench includes an application-targeted lighting system disposed around a periphery of the handle that illuminates the ratchet head and a workpiece below the output shaft. The application-targeted lighting system may include an array of Chip-On-Board LED lights. The application-targeted lighting system illuminates the workspace in applications where socket extenders and/or deep sockets are used with the ratchet wrench.

17 Claims, 6 Drawing Sheets

(56) References Cited

U.S. PATENT DOCUMENTS

| | | | | |
|---|---|---|---|---|
| 7,185,998 | B2 | 3/2007 | Oomori et al. | |
| 7,568,288 | B2 | 8/2009 | Baker | |
| 7,934,847 | B2 | 5/2011 | Oomori et al. | |
| 8,517,558 | B2 | 8/2013 | Oomori et al. | |
| 10,052,733 | B2 | 8/2018 | Ely et al. | |
| 11,213,937 | B1 * | 1/2022 | Rajzer | F21V 23/005 |
| 2004/0174699 | A1 * | 9/2004 | Minalga | B25B 23/18 362/119 |
| 2005/0157489 | A1 * | 7/2005 | Oomori | B25B 23/18 362/119 |
| 2008/0122302 | A1 | 5/2008 | Leininger | |
| 2010/0038103 | A1 * | 2/2010 | Ueda | B25B 21/00 173/217 |
| 2016/0052112 | A1 * | 2/2016 | Lemley, Jr. | B25B 23/18 362/119 |
| 2016/0354889 | A1 * | 12/2016 | Ely | B23Q 17/2404 |
| 2019/0275647 | A1 * | 9/2019 | Silha | B25B 23/147 |
| 2020/0230787 | A1 * | 7/2020 | Zhao | B25B 23/0035 |
| 2022/0088755 | A1 | 3/2022 | Rajzer et al. | |

FOREIGN PATENT DOCUMENTS

| | | | |
|---|---|---|---|
| JP | 2012245614 | A | 12/2012 |
| JP | 2015062979 | A | 4/2015 |
| JP | 2020044627 | A | 3/2020 |
| KR | 20200125157 | A | 11/2020 |
| WO | 2016196905 | A1 | 12/2016 |
| WO | 2018052923 | A1 | 3/2018 |
| WO | 2018058244 | A1 | 4/2018 |

OTHER PUBLICATIONS

Extended European Search Report for Application No. 23171195.3, dated Sep. 15, 2023.

PCT International Search Report for PCT/US2023/021634, dated Oct. 4, 2023.

* cited by examiner

APPLICATION-TARGETED LIGHT ON POWERED RATCHET OR RIGHT-ANGLE POWER TOOL

CROSS-REFERENCE TO RELATED APPLICATIONS

The present application claims priority under 35 U.S.C. § 119(e) of U.S. Provisional Application Ser. No. 63/340,355, filed May 10, 2022, and titled "APPLICATION-TARGETED LIGHT ON POWERED RATCHET OR RIGHT-ANGLE POWER TOOL." U.S. Provisional Application Ser. No. 63/340,355 is herein incorporated by reference in its entirety.

BACKGROUND

A ratchet wrench, also known as a socket spanner or a ratcheting socket wrench, is mechanical tool that tightens and loosens fasteners (e.g., nuts and bolts). Ratchet wrenches have a reversible ratcheting mechanism that allows a user to pivot the tool back and forth and turn its socket without having to remove and reposition the wrench at each turn.

DRAWINGS

The Detailed Description is described with reference to the accompanying figures. The use of the same reference numbers in different instances in the description and the figures may indicate similar or identical items.

DETAILED DESCRIPTION

Overview

Figure 1:
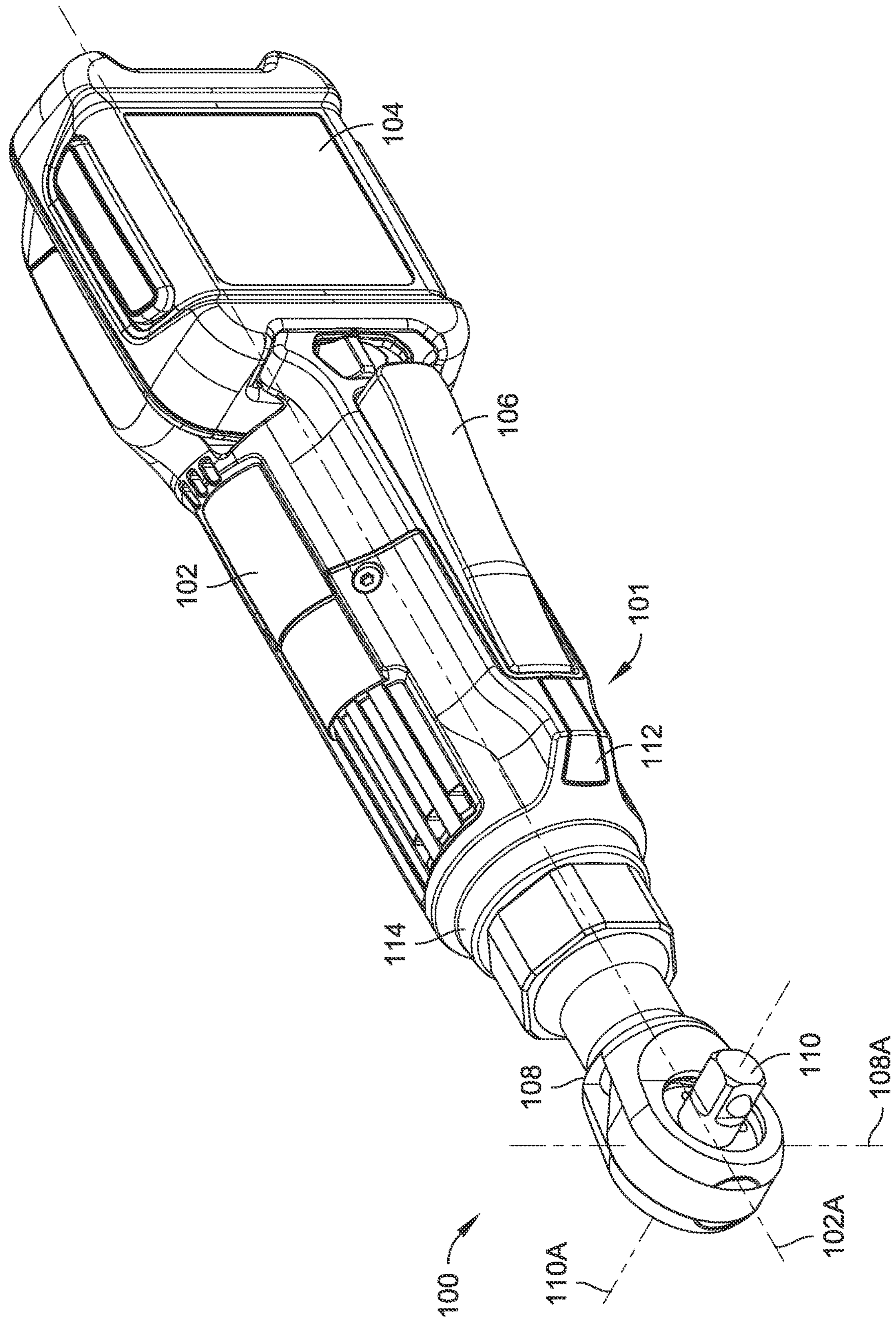
FIG. 1 is an isometric view of a powered ratchet wrench having an application-targeted lighting system in accordance with example embodiments of the present disclosure.

Power ratchet wrenches have a motor running at high RPMs in one direction, regardless of whether a nut or bolt is being tightened or loosened. The output of the motor typically goes through planetary gearing, which reduces the speed and increases the torque, typically by a gear ratio of between 4:1 and 6:1. The output of the gearing drives a crankshaft with an offset pin on the end of it. This offset pin swings a yoke that is constrained to only move from side to side. With this arrangement, one complete turn of the crankshaft swings the yoke from one side to the other and back again. The inside diameter of the yoke is lined with gear teeth that surround and interact with a pawl-based ratcheting mechanism, much like in a manual ratchet. When the yoke swings from one side to the other. the teeth lock with the pawl to turn the tool output. Then, when the yoke swings back, the teeth slip past the pawl without any movement of the tool output. A forward/reverse selector on the tool is used to change the orientation of the pawl so that it either locks with the yoke teeth for clockwise rotation of the tool output or for counter-clockwise rotation.

Cordless ratchets allow the user to tighten or loosen fasteners such as nuts or bolts in small spaces where a manual ratchet would be impractical to use. In certain applications, socket extensions are used between the output shaft of the cordless ratchet and a socket to lengthen the reach of the tool thereby allowing the user to access fasteners in locations that are hard to reach with standard sockets. However, in such applications, there is often inadequate illumination of the fastener on a workpiece. Some powered tools include lights that are focused onto a region immediately below or around a head or an anvil of the tool. However, due to the solid and compact construction of the rachet heads of cordless rachet tools, especially in applications using deep sockets or socket extensions, such light arrangements often fail to adequately illuminate the workpiece.

The present disclosure is directed to a powered ratchet tool that includes an application-targeted lighting system. In embodiments, the application-targeted lighting system is configured to cast a directed beam of light through a broad angle beneath the rachet tool in order to illuminate a workpiece and a workspace in which the workpiece is located. Additionally, in embodiments, the application-targeted lighting system described herein is configured to illuminate a workpiece within a large workspace area extending from just below the ratchet head to a point spaced apart from the rachet head, for example, in applications employing socket extensions or deep sockets.

DETAILED DESCRIPTION OF EXAMPLE EMBODIMENTS

Referring to FIGS. 1 through 5, a ratchet tool (wrench) 100 in accordance with the present disclosure is described. As shown, the ratchet tool 100 includes a handle 102 defined by a housing 103 and a ratchet head 108 coupled to the handle 102. The handle 102 is sized to be gripped by the hand of a user. In embodiments, the handle 102 may be generally cylindrical in shape. In other embodiments (not shown), the handle may have an oval-shaped cross-section or a rectangular-shaped cross-section. The handle 102 extends along a longitudinal axis 102A and has a first end 114.

The ratchet head 108 is coupled to the first end 114 of the handle 102. The rachet head 108 supports an output shaft 110, which is configured to rotate about output axis 110A. In the embodiment shown, the ratchet tool is a right-angle tool and the output axis 110A is perpendicular to the longitudinal axis 102A. In other embodiments (not shown) the output axis may be positioned at an angle from the longitudinal axis. For example, the output axis 110A may be positioned at an angle between zero degrees (0°) and one-hundred and eighty degrees (180°).

The output shaft 110 includes a socket engagement portion, for example, a drive square or bit configured to receive (i.e., be removably coupled to) one of a plurality of interchangeable sockets (not shown) to engage a fastener such as a nut or bolt of the workpiece. It should be understood that the socket engagement portion may be different from a drive square. For example, the socket engagement portion may include a female connector having a splined inner surface configured to receive one of the plurality of interchangeable sockets. In certain applications, the output shaft 110 may be connected to socket extenders or deep sockets that extend perpendicularly from the longitudinal axis 102A of the handle 102.

In embodiments, the ratchet head 108 and its internal components, described below, are formed of solid steel, and may be manufactured through a casting process, a forging process, a machining process, combinations thereof, or the like. In other embodiments, the ratchet head 108 may be formed of an alloy or other type of solid metal that can withstand high stress and/or high temperatures. For example, the ratchet head 108 may include carbide-forming metals such as, but not limited to, chromium, molybdenum, tungsten, nickel, cobalt, etc. In example embodiments, the ratchet head 108 is not covered by the housing 103 or any other non-metallic casing in order to keep the volume of the ratchet head 108 compact. In other embodiments (not shown) the ratchet head may include a non-metallic casing.

In embodiments, the ratchet tool 100 is a powered tool, having a motor 118 and a removable battery pack 104 that powers a motor 118. The output of the motor 118 is connected to a planetary gearing set 124, which reduces the speed and increases the torque delivered by the output shaft 110. For example, the planetary gearing set 124 may work at a gear ratio of between 4:1 and 6:1. The output of the gearing drives a crankshaft with an offset pin on the end of it. This offset pin swings a yoke 126 that is constrained to only move from side to side. With this arrangement, one complete turn of the crankshaft swings the yoke 126 from one side to the other and back again. The inside diameter of the yoke 126 is lined with gear teeth that surround and interact with a pawl-based ratcheting mechanism, much like in a manual ratchet. When the yoke 126 swings from one side to the other, the teeth lock with the pawl to turn the tool output. Then, when the yoke 126 swings back, the teeth slip past the pawl without any movement of the tool output.

The rachet tool 100 may further include a trigger or control switch 106 that controls operation of the motor 118. The motor 118 drives the rotation of the output shaft 110 to tighten or loosen the fastener when the trigger or control switch 106 is actuated by the user. A forward/reverse selector on the tool is used to change the orientation of the pawl so that it either locks with the yoke teeth for clockwise rotation of the tool output or for counter-clockwise rotation. The forward/reverse selector may be located in the back of the ratchet head 108, on the opposite side of the output shaft 110.

In other example embodiments, the ratchet wrench 100 may comprise an electric motor powered by an external power source via an electric cord. In other example embodiments, the ratchet wrench 100 may be a pneumatic tool having a drive mechanism employing a pneumatic motor powered by a source of compressed air. In yet another example embodiment, the ratchet wrench 100 may have a manual mode, where the user may pivot the handle 102 of the ratchet wrench 100 to manually drive rotation of the output shaft 110, thereby tightening or loosening the fastener.

Figure 6:
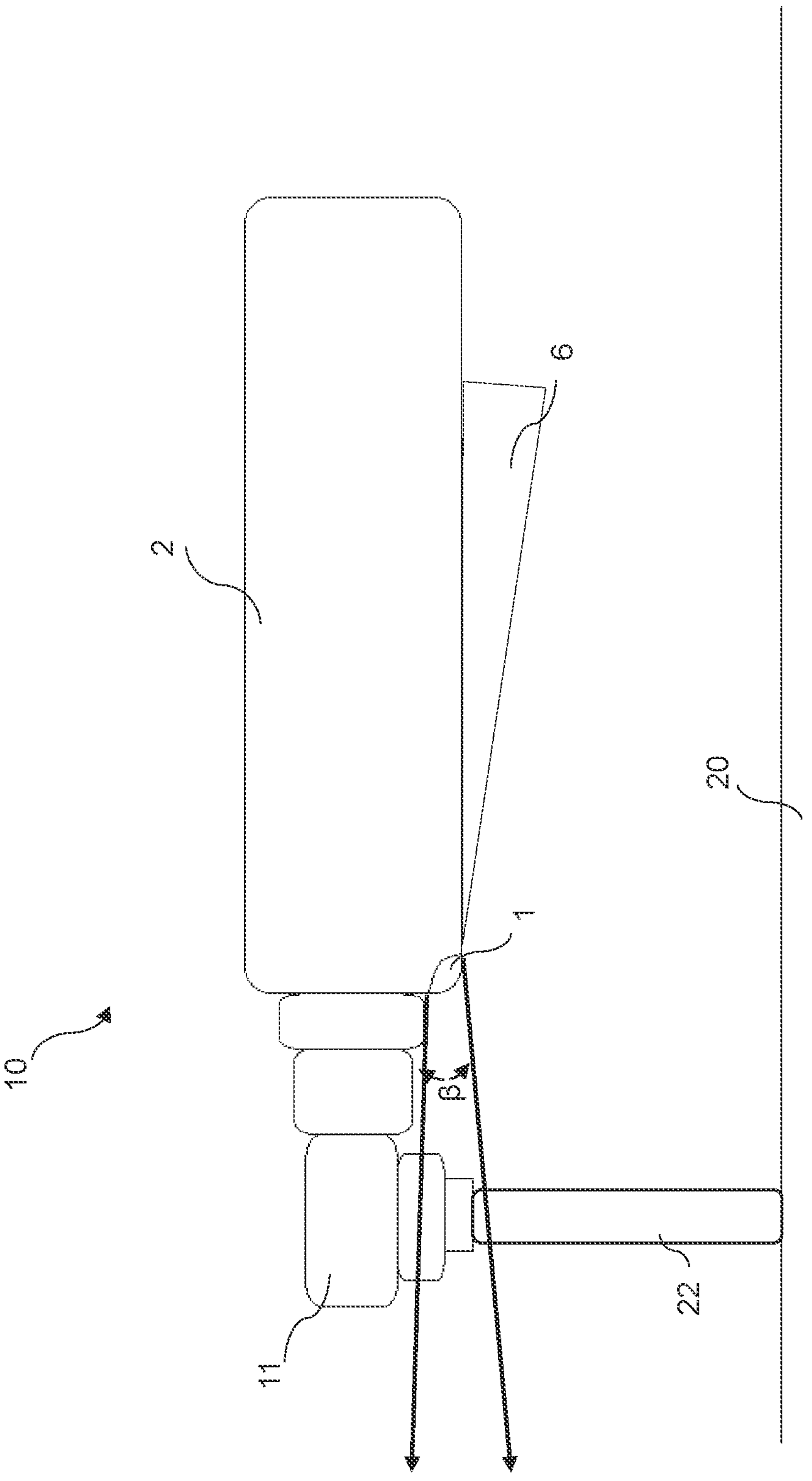
FIG. 6 (PRIOR ART)
FIG. 6 is a side view of a powered tool having a spotlight.

Referring to FIG. 6 a typical power tool 10 is shown having a handle 2, a trigger 6, and an output head 11 coupled to an extension 22. The power tool 10 includes a spotlight 1 illuminating the immediate vicinity of the output head 11 along a narrow angle β. The light emitted by the spotlight 1 is focused on the end of the output head 11 and is limited to incidental (not intentional) illumination to any areas outside the range of angle β.

Figure 2:
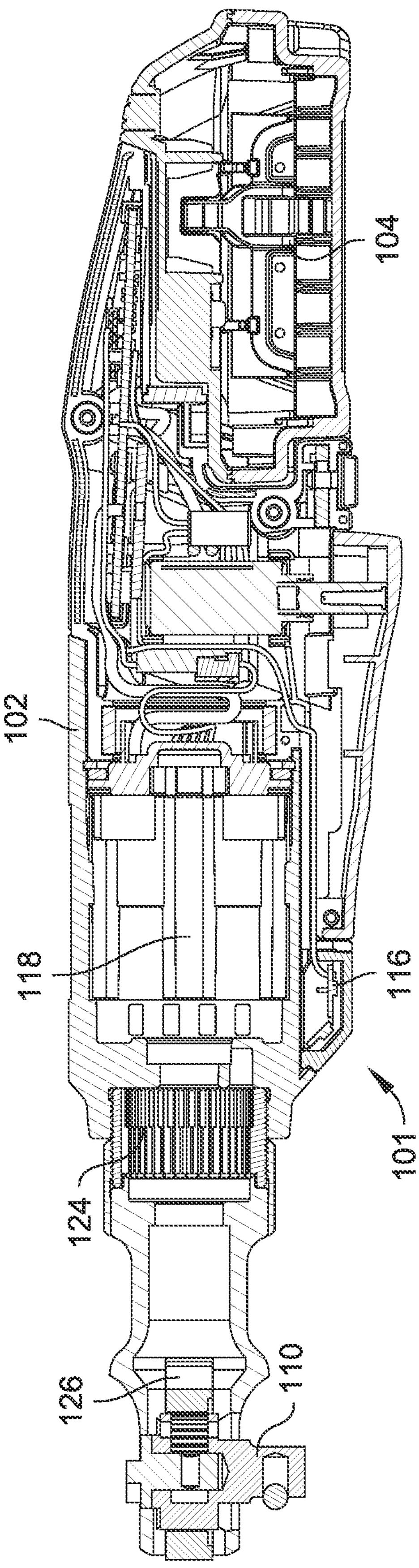
FIG. 2 is a cross-sectional side view of the powered ratchet wrench shown in FIG. 1 in accordance with example embodiments of the present disclosure.
Figure 3:
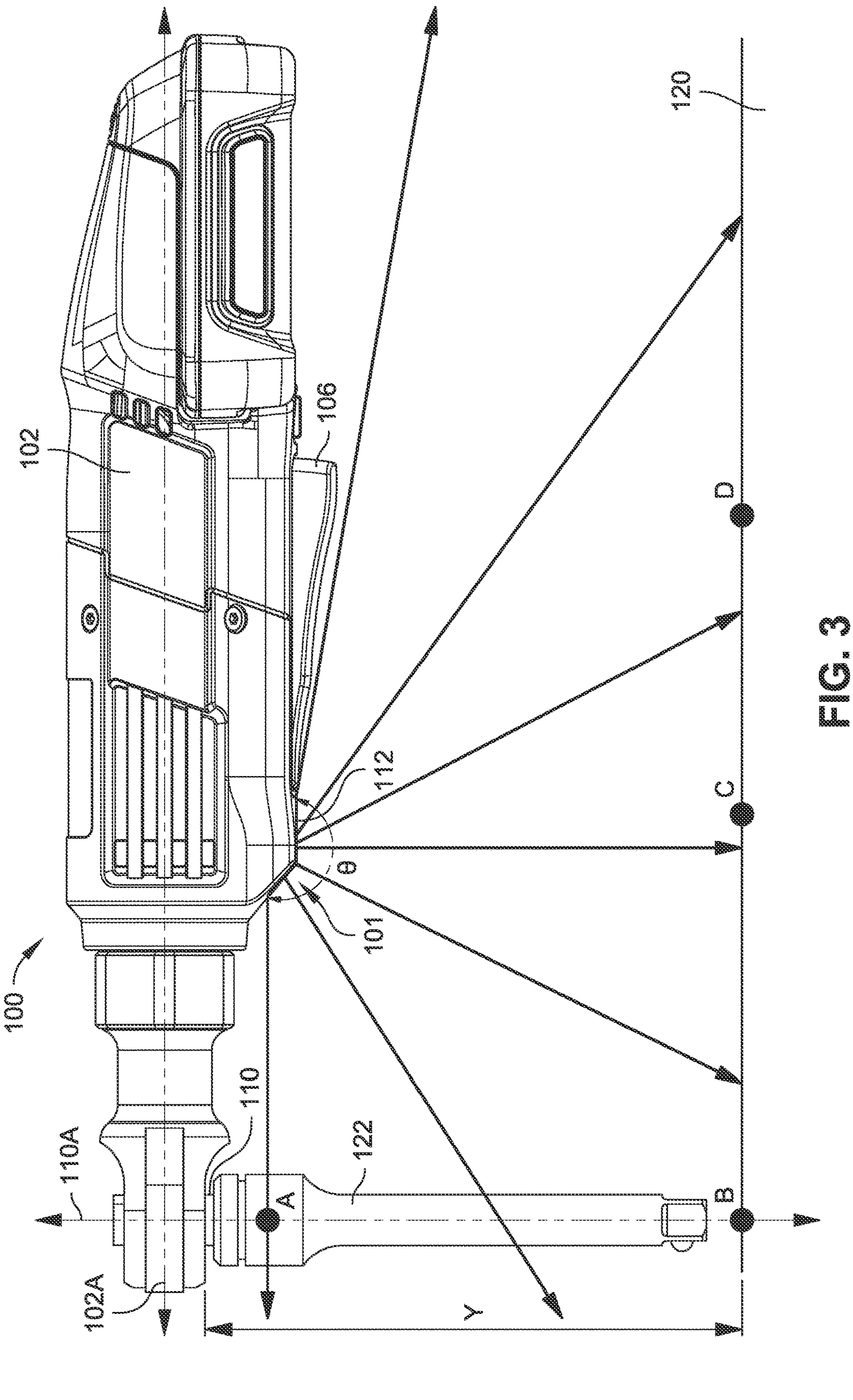
FIG. 3 is a side view of the powered ratchet wrench shown in FIG. 1 illustrating a range of light cast by the application-targeted lighting system in accordance with example embodiments of the present disclosure.
Figure 4:
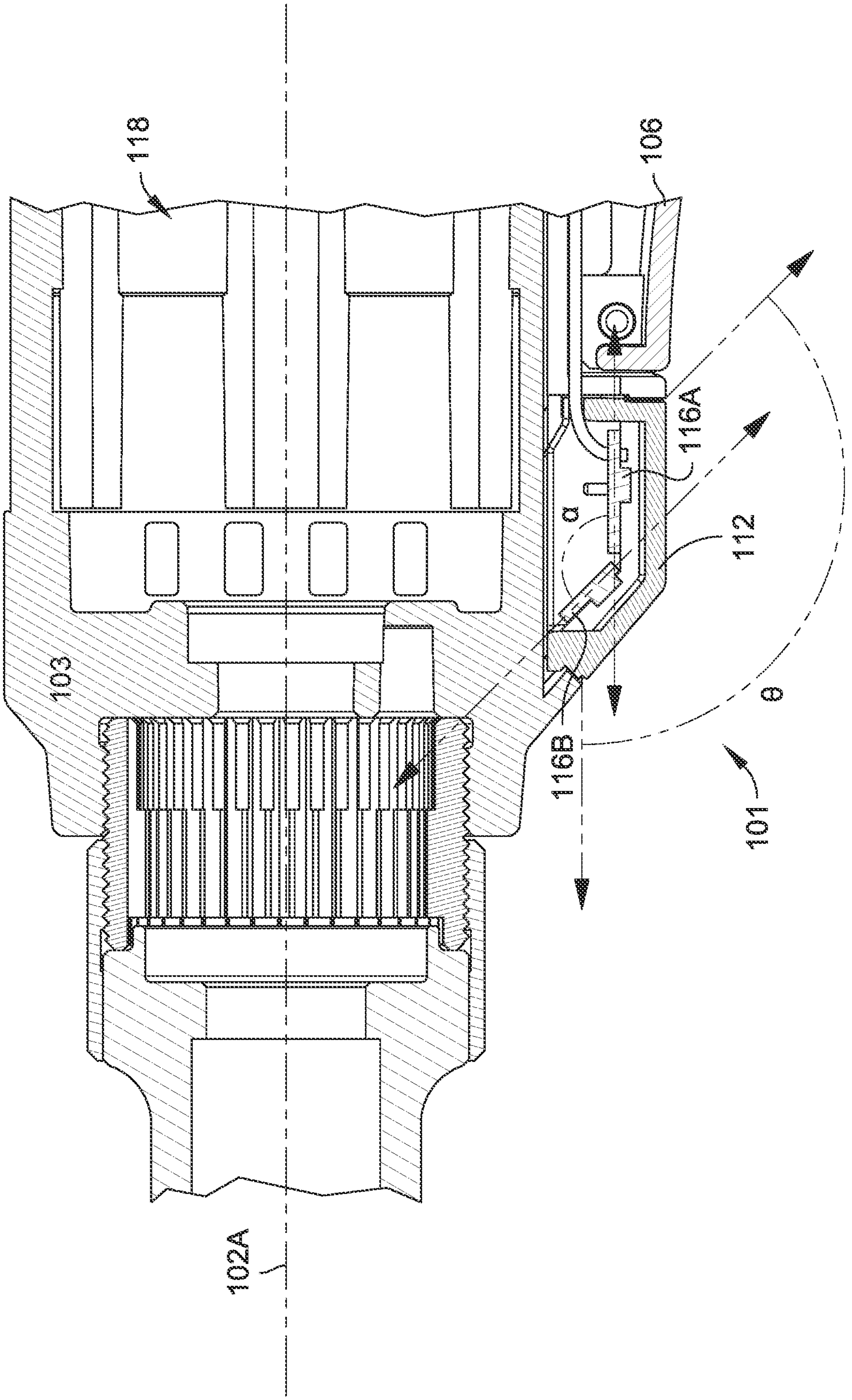
FIG. 4 is a cross-sectional side view of the application-targeted lighting system with an array of LED lights shown in FIG. 2, in accordance with example embodiments of the present disclosure.

As shown in FIGS. 2 through 4, the ratchet tool 100 includes an application-targeted lighting system 101. The application-targeted lighting system 101 is integrated around the periphery of the housing 103 and is disposed above the trigger or control switch 106. The application-targeted lighting system 101 includes an array, or a plurality, of light-emitting diode (LED) lights 116. In embodiments, the array of LED lights 116 is directed (aimed) through an arc extending towards the output shaft 110 at a point A; along the output axis 110A to the end of the extension socket 122 at a point B; downwards, perpendicular to the longitudinal axis 102A, at a point C; and, in embodiments, backwards, along the lower surface of the handle 102 at a point D.

The application-targeted lighting system 101 is configured to illuminate the area below or around the output shaft 110 and also direct light away from the rachet tool 100 towards a workpiece 120 to be illuminated. In this manner, the workpiece may be illuminated before the ratchet wrench 100 is placed in an operating position by the user (i.e., the user places the socket onto the fastener), as well as while the rachet tool 100 is placed in the operating position and in use. The application-targeted lighting system 101 may effectively illuminate a workpiece from a distance Y, where the distance Y ranges from about three inches (3 in.) and upwards to about three feet (3 ft). In other example embodiments, the application-targeted lighting system 101 may illuminate a workpiece 120 at a distance of at least three feet (3 ft.). It should be understood that this effective illuminating distance is an example and the application-targeted lighting system 101 may effectively illuminate the end of any extension socket 122.

In embodiments, the application-targeted lighting system 101 is connected to a control board 115 that controls the actuation of the application-targeted lighting system 101. For example, the control board 115 may turn on the application-targeted lighting system 101 when the trigger or control switch 106 of the ratchet tool 100 is actuated and keep the application-targeted lighting system 101 on after a predetermined time period has passed. In other example embodiments, the application-targeted lighting system 101 may include a lighting switch (not shown) that allows the application-targeted lighting system 101 to illuminate the workpiece 120 without simultaneously activating the motor 118 by actuating the trigger or control switch 106. In yet another example, the application-targeted lighting system 101 may be actuated by the control board 115 when the trigger or control switch 106 has been only partially actuated.

As shown in FIG. 4, the application-targeted lighting system 101 includes a transparent lens 112 that covers the array of LED lights 116 from the outside environment. The transparent lens 112 may protect the electrical components of the application-targeted lighting system from dust, smoke, water, and oil among other liquids and contaminants.

In example embodiments, the transparent lens 112 refracts the light of a single LED light or of the array of LED lights 116 flooding the area around the workpiece 120 at the distance Y. As shown in FIG. 3, the lens 112 may refract the light creating an effective illumination arc at an angle θ, where the angle θ may be, for example, between ninety degrees (90°) and two-hundred and twenty-five degrees (225°) in relation to the longitudinal axis 102A of the handle 102 as described above. In example embodiments, the transparent lens 112 may refract the light in a direction transverse or perpendicular from the longitudinal axis 102A, along a transverse axis 108A (shown in FIG. 1). The light refracted along the transverse axis 108A may cover an angle range (not shown), for example, but not limited to, from about ninety degrees (90°) to about one-hundred and twenty degrees (120°). This effective area of illumination allows the user to ascertain that the ratchet tool 100 is being directed in the right angle and direction towards the workpiece 120 prior to connecting the end of the extension socket 122 to the fastener (not shown) in the workpiece 120.

In example embodiments, the array of LED lights 116 may use chip-on-board (COB) technology. Each individual LED light chip is mounted in direct contact with a substrate. The substrate may be, but is not limited to, silicon carbide or sapphire. In COB LED arrays, a high packing density of the LED lights is achieved, providing a high lumen density to the application. In other example embodiments, the LED light array may be mounted using Dual In-line Package (DIP) or Surface Mounted Device (SMD) technology. In other embodiments (not shown), the application-targeted lighting system may include an array of LED lights that does not use COB technology.

Figure 5:
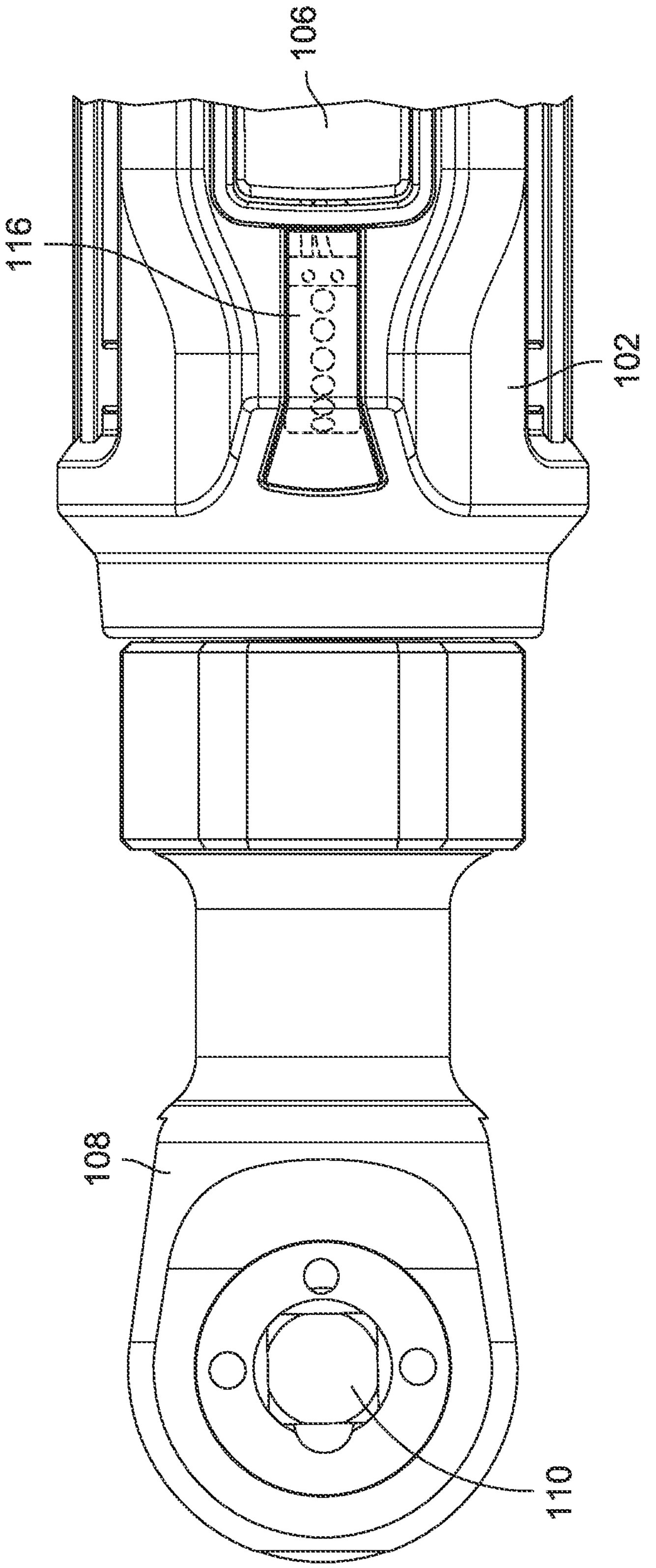
FIG. 5 is a front view of a powered ratchet wrench showing a flexible circuit strip having an array of LED lights in accordance with example embodiments of the present disclosure.

Referring to FIGS. 4 and 5 the array of LED lights 116 may be comprised of a first array of LED lights 116A disposed on the perimetry of the handle 102, and aligned parallel to the longitudinal axis 102A and a second array of LED lights 116B disposed at an angle α from the first array of LED lights 116A, wherein the angle α is more than or equal to ninety degrees (90°) measured clockwise in the example embodiments of FIG. 4.

In the example embodiment shown in FIG. 5 the array of LED lights 116 may be disposed on a single, flexible circuit board or flexible printed circuit (FPC) that bends at the angle α discussed above. The material used in the flexible circuit board may include, but is not limited to, polyimide having at least one layer of copper. It should be understood that other materials may compose the FPC on which the array of LED lights 116 is disposed.

In another example embodiment (not shown) the array of LED lights 116 may be disposed on a pivoting mechanism attached to the handle 102. The pivoting mechanism may be directed by the user to focus on a particular area of the workpiece 120.

In the example embodiment shown in FIG. 2, the application-targeted lighting system 101 is electrically connected to the battery pack 104. In other example embodiments where the ratchet wrench 100 is powered by an external power source, the application-targeted lighting system 101 may be powered by a smaller internal battery or an external electrical source (not shown).

It should be understood that, although a powered ratchet tool 100 is described herein as an example embodiment of the present disclosure, the application-targeted lighting system 101 may be employed by other right-angle power tools, including, but not limited, to right-angle drills, nut runners, impact wrenches, and so forth.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A power tool comprising:

a handle extending along a longitudinal axis and having a first end and a second end, the handle configured to house a motor;

an output head connected to the first end of the handle, the output head supporting an output shaft driven by the motor, the output shaft rotating about an output axis, wherein the output axis is perpendicular to the longitudinal axis;

an application-targeted lighting system disposed proximate to the first end of the handle, the application-targeted lighting system including:

a first array of LED lights disposed parallel to the longitudinal axis, a second array of LED lights disposed at an obtuse angle from the first array of LED lights, and a lens covering the first array of LED lights and the second array of LED lights, the lens configured to refract the light emitted by the first array of LED lights and the second array of LED lights into an effective illumination arc having an arc length θ, where θ is between ninety degrees (90°) and two-hundred and twenty-five degrees (225°), wherein the illumination arc is configured to illuminate the output shaft and a workpiece below the output shaft.

2. The power tool of claim 1, wherein the output head is fully composed of a metal selected from a group including at least one of steel, chromium, molybdenum, tungsten, nickel, and cobalt.

3. The power tool of claim 1, wherein the first array of LED lights and the second array of LED lights are comprised of chip-on-board (COB) LEDs.

4. The power tool of claim 1, wherein the power tool is a right-angle ratchet wrench.

5. A power tool comprising:

a handle extending along a longitudinal axis and having a first end and a second end;

an output head connected to the first end of the handle, the output head supporting an output shaft, the output shaft rotating about an output axis, wherein the output axis is perpendicular to the longitudinal axis, and an application-targeted lighting system disposed proximate to the first end of the handle, the application-targeted lighting system including:

a first array of LED lights disposed parallel to the longitudinal axis, a second array of LED lights disposed at an angle α from the first array of LED lights, where the angle α is between ninety degrees (90°) and one-hundred and eighty degrees (180°), and a lens covering the first array of LED lights and the second array of LED lights, the lens configured to refract the light emitted by the first array of LED lights and the second array of LED lights into an effective illumination arc having an arc length θ, where θ is between ninety degrees (90°) and two-hundred and twenty-five degrees (225°), wherein the illumination arc is configured to illuminate the output shaft and a workpiece below the output shaft.

6. The power tool of claim 5, wherein the first array of LED lights and the second array of LED lights are comprised of chip-on-board (COB) LEDs.

7. The power tool of claim 5, wherein the output head is fully composed of a metal selected from a group including at least one of steel, chromium, molybdenum, tungsten, nickel, and cobalt.

8. The power tool of claim 5, wherein the application-targeted lighting system includes a flexible printed circuit (FPC) having the first array of LED lights and the second array of LED lights disposed along the length of the FPC, and where the FPC bends at the angle α from the longitudinal axis.

9. The power tool of claim 5, wherein the power tool is a right-angle ratchet wrench.

10. A powered ratchet tool comprising:

a handle extending along a longitudinal axis and having a first end and a second end, the handle configured to house a motor;

a ratchet head connected to the first end of the handle, the ratchet head supporting an output shaft driven by the motor, the output shaft rotating about an output axis, wherein the output axis is perpendicular to the longitudinal axis, and a ratchet, the ratchet configured to restrict the rotation of the output shaft in a first direction and to allow rotation of the output shaft in a second direction opposite the first direction; and an application-targeted lighting system disposed proximate to the first end of the handle, the application-targeted lighting system including:

a first array of LED lights disposed parallel to the longitudinal axis, a second array of LED lights disposed at an angle α from the first array of LED lights, where the angle α is between ninety degrees (90°) and one-hundred and eighty degrees (180°), and a lens covering the first array of LED lights and the second array of LED lights, the lens configured to refract the light emitted by the first array of LED lights and the second array of LED lights into an effective illumination arc having an arc length θ, where θ is between ninety degrees (90°) and two-hundred and twenty-five degrees (225°), wherein the illumination arc is configured to illuminate the output shaft and a workpiece below the output shaft.

11. The powered ratchet tool of claim 10, wherein the ratchet head is fully composed of a metal selected from a group including at least one of steel, chromium, molybdenum, tungsten, nickel, and cobalt.

12. The power tool of claim 1, wherein the lens includes a first face and a second face, the first face and the second face disposed at an angle α, where the angle α is between ninety degrees (90°) and one-hundred and eighty degrees (180°).

13. The power tool of claim 12, wherein the first face and the second face are respectively parallel to the first array of LED lights and the second array of LED lights.

14. The power tool of claim 5, wherein the lens includes a first face and a second face, the first face and the second face disposed at the angle α.

15. The power tool of claim 14, wherein the first face and the second face are respectively parallel to the first array of LED lights and the second array of LED lights.

16. The powered ratchet tool of claim 10, wherein the lens includes a first face and a second face, the first face and the second face disposed at the angle α.

17. The powered ratchet tool of claim 16, wherein the first face and the second face are respectively parallel to the first array of LED lights and the second array of LED lights.

* * * * *